Aug. 14, 1923.

F. C. MOORE 1,465,229

AUTOMOBILE TIRE CASING TRIMMING AND LINING MACHINE

Filed Aug. 18, 1919    6 Sheets-Sheet 1

WITNESSES
R. Rousseau
J. P. Schrott

INVENTOR
Frank C. Moore,
BY
ATTORNEYS

Aug. 14, 1923.

F. C. MOORE 1,465,229

AUTOMOBILE TIRE CASING TRIMMING AND LINING MACHINE

Filed Aug. 18, 1919   6 Sheets-Sheet 2

Aug. 14, 1923.

F. C. MOORE

AUTOMOBILE TIRE CASING TRIMMING AND LINING MACHINE

Filed Aug. 18, 1919 6 Sheets-Sheet 3

1,465,229

WITNESSES
R. Rousseau
J. P. Schrott

INVENTOR
Frank C. Moore,
BY
ATTORNEYS

Aug. 14, 1923.   1,465,229
F. C. MOORE
AUTOMOBILE TIRE CASING TRIMMING AND LINING MACHINE
Filed Aug. 18, 1919   6 Sheets-Sheet 4

INVENTOR
Frank C. Moore,
BY
ATTORNEYS

Patented Aug. 14, 1923.

1,465,229

UNITED STATES PATENT OFFICE.

FRANK C. MOORE, OF CANTON, OHIO.

AUTOMOBILE TIRE-CASING TRIMMING AND LINING MACHINE.

Application filed August 18, 1919. Serial No. 318,171.

*To all whom it may concern:*

Be it known that I, FRANK C. MOORE, a citizen of the United States, and a resident of Canton, in the county of Stark and State of Ohio, have invented certain new and useful Improvements in Automobile Tire-Casing Trimming and Lining Machines, of which the following is a specification.

My invention relates to improvements in trimming and lining machines for automobile tire casings, and it consists in the constructions, combinations and arrangements herein described and claimed.

The foremost object of the invention is to provide a machine by means of which certain fin-like rubber portions left on the tire casing in curing, can be removed and a special preparation applied to the inside of the casing, in one operation.

A further object of the invention is to provide a machine for the purpose described, by means of which the two operations of trimming the casing and applying a special preparation on the inside can be accomplished much more quickly than if the same operations were performed by hand, but with the added and important result that the work is done neatly and does not have to be gone over a second time.

A further object of the invention is to provide a machine for trimming and lining an automobile tire casing, certain actions, as for example, stopping the rotation of the tire casing and the spraying of the lining fluid, being accomplished semi-automatically.

A further object of the invention resides in the novel manner of slowly agitating the contents of the lining fluid tank, while a new tire casing is being put in position on the machine.

A further object of the invention resides in the novel construction of the bead guard with which one of the abrading wheels co-operates in removing the rubber fins from the edges of the casing beads.

A further object is to provide a novel construction in the liquid spray head, whereby the liquid spray is prevented from being blown out to spatter surrounding parts, including the outside of the tire casing.

Other objects and advantages will appear in the following specification, reference being had to the accompanying drawings, in which:—

By way of introduction, it is well to understand the purpose of the machine and the objectionable features now encountered in preparing automobile tire casings for the market after leaving the curing room. According to the present method of manufacture of automobile tire casings, fin-like portions of rubber remain on the inner edges of the beads and on the periphery of the casing.

This is largely due to the squeezing through of the rubber at the joints of the mold in curing the casing.

In order to remove these rubber fins, the operator uses a scissors, but in actual practice it is often found that the work is not done with sufficient perfection to pass inspection. It is therefore necessary to send the casing back for a second and more perfect trimming operation.

A special preparation is also applied to the inside of the tire casing, for the purpose of preventing the inner rubber tube from sticking to the casing by reason of the heat produced by friction. In order to obtain the best results, this preparation which is in the form of a liquid, should be evenly applied. A ball-like brush is used at present to apply this liquid, and obviously, it takes an expert operator to apply the liquid in such a manner that none runs over on the outside of the casing, thus presenting a bad appearance.

Ordinarily, so much of this lining liquid gets on the outside of the casing, that the casing must be sent back for cleaning by removing the dried spots of lining preparation. The foregoing methods are both very slow, and in addition, are extremely imperfect. It also often happens that the lining liquid is applied so thickly in some places that the casing must be turned inside out so that it may be scraped clean and a fresh lining applied.

With the above objectionable features in tire casing manufacture in mind, attention is now directed to the improved machine by means of which these objections are overcome. For the purpose of enabling a quick understanding of the construction, the five major parts of the machine are described in regular order, and then follows a brief review of the operation.

The frame 1 includes the base shown in the drawings, to which suitable legs 2 are attached. The tire yoke 3 includes the standard 4, which in turn is suitably affixed to the base 1. The arms 3 of the yoke are spread out as clearly shown in Figure 4, giving the yoke a Y-shaped appearance.

The tire casing T is indirectly supported by the tire yoke and in the operation of the machine, the tire casing is made to revolve in respect to the yoke, the trimming and lining functions being performed during such rotation of the casing T. Journals 5 support the driven shafts 40, 41 on each of which a casing driving or revolving sheave 7 is mounted.

These sheaves are made to turn in the same direction, thereby imparting the rotational movement of the tire casing above referred to. A pair of guide sheaves 8 at the top hold the casing T in place by keeping it from falling over. These sheaves are not driven in the same manner as are the sheaves 7 at the bottom, but simply revolve by virtue of the frictional contact between the sheaves and casing. They are heavy enough to hold the tire casing in place.

Sheave arms 9 extend forwardly from the extremities of the yoke arms 3, and carry the guide sheaves 8. The guide sheaves are journaled on the arms as shown. The arms in turn are pivotally mounted at 10 at the extremities of the arms 3. The sheave arms 9, together with the guide sheaves 8, are movable up and down by the operator's lever 11 which extends to the front.

This lever is pivoted at 12 to a suitable bracket 13. The rearward extension of the lever is pivoted to the link 14, which in turn is pivoted to the rearward extension or crank 15 on the pivotal shaft 10. When the operator's lever 11 is pressed down, the guide sheaves 8 are enabled to lower into contact with the tire casing T. Conversely, when the operator's lever 11 is raised, the guide sheaves 8 are similarly raised out of contact with the tire casing.

Figures 1, 2, 3:
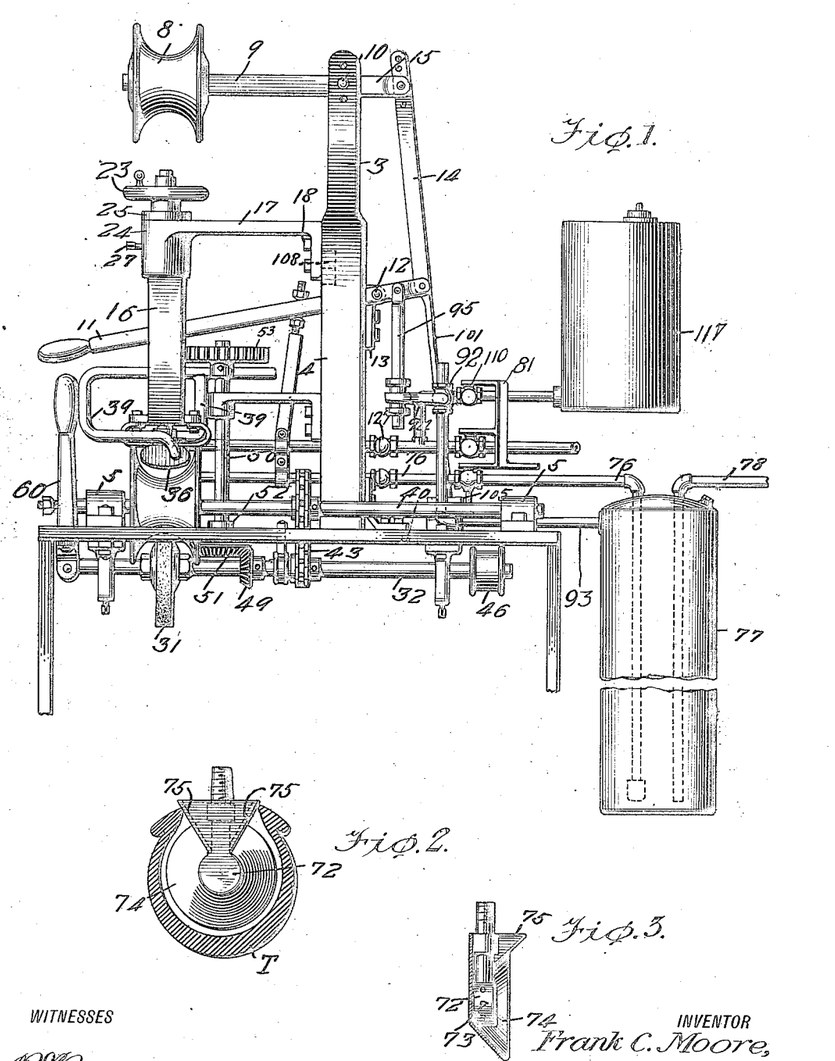
Figure 1 is a side elevation of the improved trimming and lining machine.
Figure 2 is a detail cross sectional view showing the improved liquid spray head inside of the casing.
Figure 3 is a vertical section of the spray head.

Means for accommodating various sizes of casings is provided by making the arms 9 adjustable. To this end, the arms 3 and the link 14 have holes, of which the proper sets are selected for the insertion of the pivot pins. The arrangement is clearly shown in Figure 1.

Certain operations are performed in the automatic stop mechanism, simultaneously with the operation of the lever 11, but these operations are fully described under that head. An adjusting standard 16 is disposed in front of the standard 4 of the tire yoke. It is supported in place by the bracket 17 which is suitably secured to the standard 4 at 18. The vertical abrading shaft 19 is mounted in the standard 16. This shaft has a long driven pinion 20 which meshes with the spur gear 53, forming part of the drive mechanism described below.

It is necessary to make the driven pinion 20 long for purposes of longitudinal adjustment on the shaft 19. The vertical adjustment of the shaft 19 is obtained when necessary, by loosening the set collars 22 and then turning the hand wheel 23 until the desired position of the abrading mechanism is reached.

The standard 16 includes the upper boss 24, which is capped by a plate 25 at the top for the support of the hand wheel 23. The upper end of the shaft 19 is journaled in a sleeve 26 which is located in the bore of the boss 24. The sleeve 26 is capable of longitudinal adjustment, but is kept from turning by virtue of the set screw 27 which enters the slot 28 at one side of the sleeve.

The upper end of the sleeve 26 is threaded at 29, and it is on this threaded portion, which extends beyond the plate 25, that the hand wheel 23 is screwed. It can be plainly seen in Figure 12, that the shaft 19, the sleeve 26 and the parts of the abrading mechanism carried by the shaft, are all supported by the hand wheel 23. By turning the hand wheel 23, minor adjustments up and down of the abrading mechanism, can be made. Other adjustments are made by unloosening the set collar 22 as already explained above. Attention is now directed to

The abrading mechanism.

This mechanism consists principally of the beveled abrading wheel 30, on the lower end of the vertical abrading shaft 19, and the abrading wheel 31 on the main drive shaft 32. The beveled abrading wheel 30 is for the purpose of removing the rubber fins on the inner edges of the beads *b* of the tire casing T. The abrading wheel 31 is for the purpose of removing the peripheral fin *f*.

Figures 5, 6, 13:
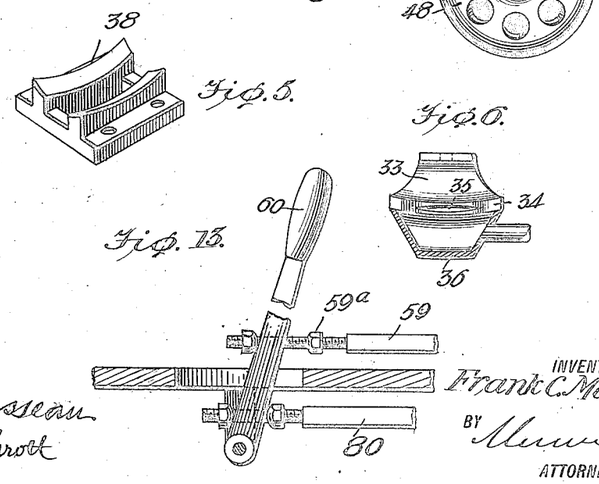
Figure 5 is a detail perspective view of the casing guide cradle.
Figure 6 is a detail cross section of the bead guide.
Figure 13 is a detail sectional view of the control handle 60.
Figure 8:
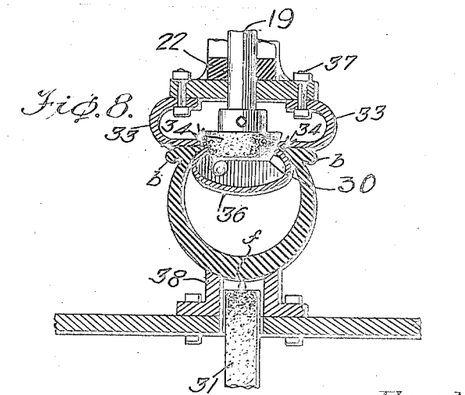
Figure 8 is a detail cross section on the line 8—8 of Figure 4, showing the bead guide and the guard which protects the tire casing from the abrading wheel.

A bead guard 33 protects the beads *b* from injury by the abrading wheel 30. This bead guard is made as shown in Figures 6 and 8. It will be observed in Figure 6, that the lateral creases 34 of the bead guard are provided with narrow kerfs 35 through which the rubber fins on the edges of the beads *b* extend when the casing is applied as shown in Figure 8, thereby causing the abrading wheel 30 to act only on the rubber fins and not on the beads to which they are attached.

A casing guard 36, which forms a part of the bead guard 33, extends between the creases 34, and besides serving to keep the positions of the kerfs 35 fixed, prevents contact of the abrading wheel 30 with the tire casing T during adjustment. The bead guard is suitably affixed to the standard 16 by the means 37 shown in Figure 8. Obviously, on excessive wear of the edges of the bead guard at the creases 34, an entirely new bead guard can be substituted at a comparatively small cost.

Cooperating with the lower abrading wheel 31 is a casing guide cradle 38 for the purpose of assisting in holding the casing T in position. The cradle 38 is not very large. The upper portions are made to fit the curvature of the tire casing as clearly indicated in Figures 5 and 8. It has an open body as shown, for the purpose of admitting the fin *f* from above, and the abrading wheel 31 from below. The purpose of making the cradle relatively small is, to avoid excessive friction or retardation of the movement of the tire casing. As has already been explained, the upper or beveled abrading wheel 30 is adjustable in vertical position by turning the hand wheel 23, while adjustments of the abrading wheel 30 in respect to the kerfs 35 are obtained by means of the set collars 22 on the shaft 19.

It is also to be observed that suitable means is provided for disposing of the ground rubber falling at the edges or creases 34 of the bead guard. This means may consist of a pair of pipes 39 leading to places adjacent to the points of contact of the abrading wheel 30, and being connected to some suitable suction apparatus for drawing away the rubber ground off by the abrading wheel.

The drive mechanism includes a pair of shafts 40 and 41 running parallel with the main drive shaft 32 and being driven thereby through the chain 43. This chain runs over a normally loose drive sprocket 44 on the main drive shaft and over driven sprockets 45 on the shafts 40 and 41 respectively.

Figure 4:
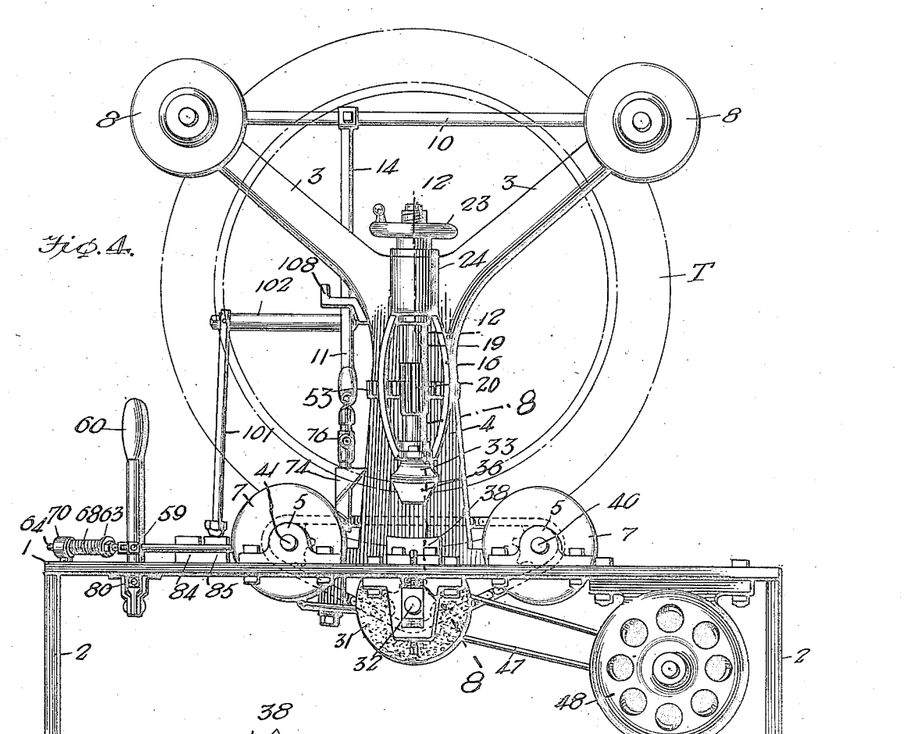
Figure 4 is a front elevation of the improved machine, a tire casing being shown in place in dot and dash lines.

The drive sheaves 7 are mounted on the shafts 40 and 41. All three of the shafts, namely, 32, 40 and 41 in Figure 7, run in the same direction. The main drive shaft 32 has a drive pulley 46 which is belted at 47 to the drive motor 48. The motor is secured in any suitable position, and may be secured beneath the base 1, as shown in Figure 4.

A bevel drive pinion 49, fixed on the main drive shaft 32, drives the vertical counter shaft 50 by meshing with the driven bevel gear 51 on the bottom of the shaft. The counter shaft 50 is journaled in suitable bearings 52. It carries the spur gear 53 on the upper end. This gear meshes with the long driven pinion 20 on the vertical abrading shaft 19. The gear 53 stands in a relatively fixed place, but the pinion 20 is vertically shiftable by reason of the adjusting mechanism described above, and for that reason the pinion 20 is made relatively long, while the gear 53 is relatively narrow.

A shiftable clutch 54 enables the connection of the normally loose sprocket 44 with the main drive shaft 32 when it is desired to set the drive sheaves 7 in motion. The clutch 54 is movable on a spline 55 as in Figure 7. The adjacent portions of the clutch 54 and sprocket 44 have suitable clutch surfaces, which when engaged, provide the necessary driving engagement. The clutch 54 is actuated by the clutch lever 56, which is pivoted at 57 and at the other end, has an adjustable connection 58 to the actuating rod connection 59. This rod connection 59 is actuated by a short lever 60, to which it has a loose and adjustable connection as in Figure 7. This connection is also clearly shown at 59ª in Figure 13, and the purpose of the arrangement referred to is more fully described below. This lever starts and stops the rotation of the tire casing T, and also starts and stops the spraying action described below.

Any desired or necessary adjustment of the lever 56 can be made by means of the check nut 61 on the threaded portion 62 of the rod connection 59, at either side of the connection 58. The respective adjustments of the rod connection 59 are held by the toggle mechanism 63. This mechanism comprises a pair of arms 64 which are suitably pivoted at the inner ends, to the rod connection 59. Each arm is partly threaded at 66 to enable adjustment of the stop nut 67. A spring 68 bears at one end against the stop nut, and at the other end, against a loose washer 69 which in turn rests against the pivoted bearing 70.

The bearing 70 has a cone-shaped opening 71 for the reception of the outer end of the arms 64. It can be readily understood that on moving the rod connection 59 in one or the other direction, the arms 64 will extend through the openings 71 in the bearing 70 a greater distance, the spring 68 will compress, and when the proper position of the rod connection 59 is reached, the springs 68 will operate to hold the adjustment until the rod connection 59 is again moved by the operation of the handle or lever 60.

The spraying mechanism comprises first of all, a liquid spray head which consists of a liquid outlet 72, with a plurality of fine openings 73, through which the liquid discharges against the deflector or spray cone 74. The openings 73 may be bored in either straight or at a slight angle as may be desired. On striking the deflector or spray cone, the liquid is turned into fine spray which is discharged in all directions over the spray cone and against the interior of the tire casing T. The liquid is prevented from spraying out of the open side of the tire casing, by wings 75 which engage the edges of the beads b and thus serve to close off the casing at the points adjacent to the spray cone.

Suitable pipe connections 76 lead from the liquid 72 to the tank 77. This tank contains a quantity of the liquid which is sprayed on the inside of the tire casing to form a lining. Compressed air is admitted to the tank 77 through a pipe 78. On moving the rod connection 59 outwardly into the position indicated in Figure 7, the drive sheaves 7 are set into motion, and the throttle valve 79 is opened so as to cause the discharge of liquid spray on the inside of the casing as it rotates.

Figure 14:
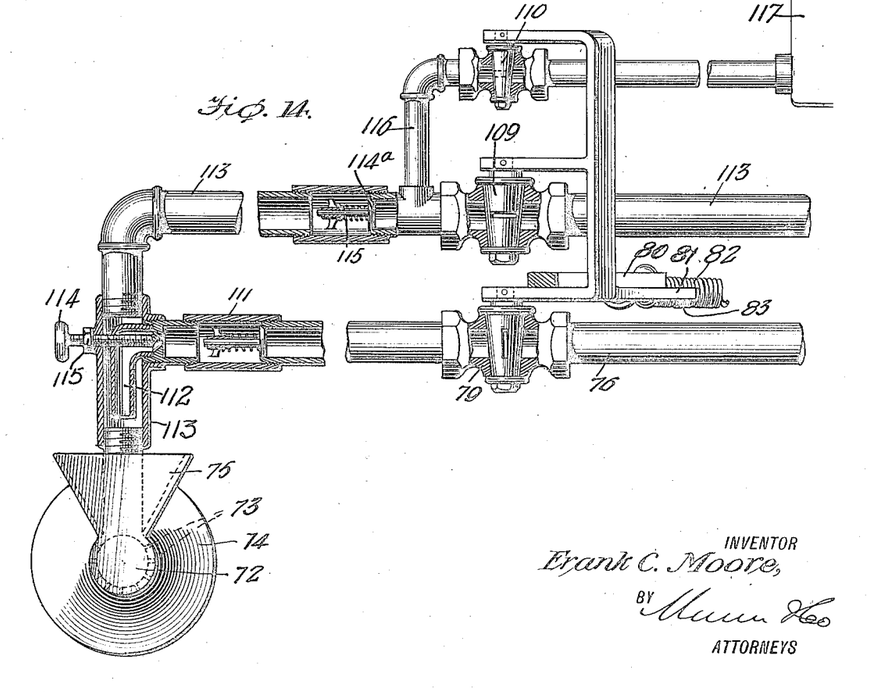
Figure 14 is a detail sectional view of the various control valves hereinafter described.

The spray head is located at any convenient point, but preferably near the abrading mechanism as shown in Figure 4. The opening of the throttle valve 79 is accomplished by the link 80 which is connected to the handle 81 of the throttle valve 79, and loosely connected to the handle 60. As shown in the drawings, the arrangement of connections enables the initial operation of the clutch rod 56, before the throttle valve is opened. A triple valve mechanism is associated with the handle 81, as shown in Figure 14, but reference is had to the description below for a full explanation of the construction and mode of operation.

Figure 7:
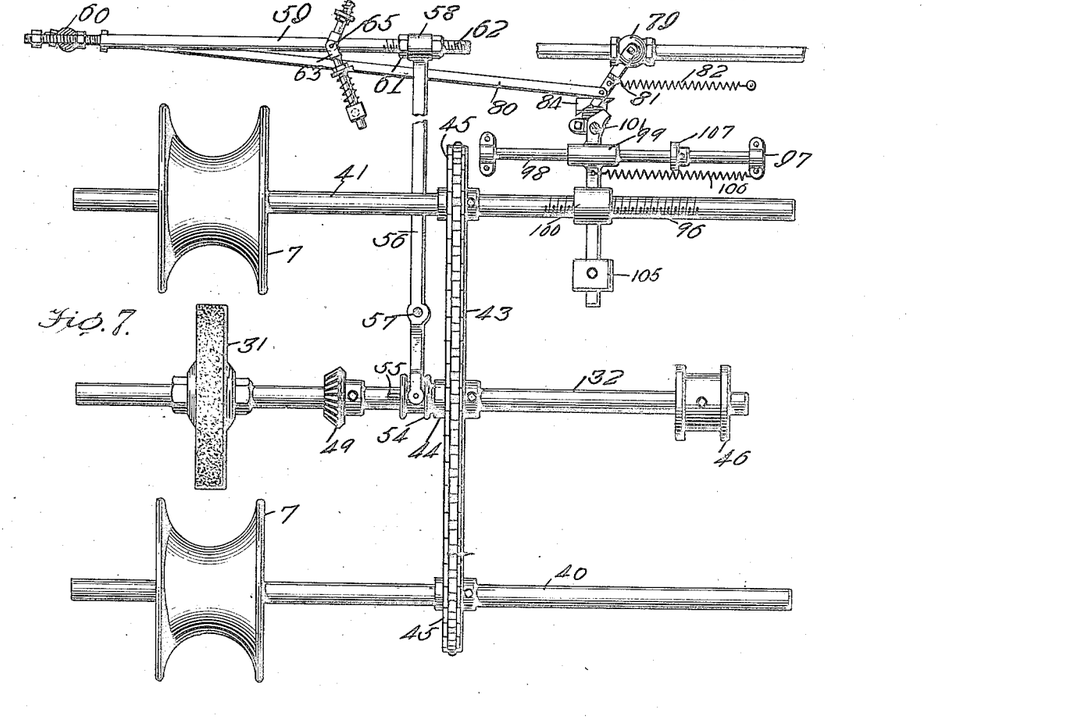
Figure 7 is a detail plan view, showing more particularly some of the parts of the drive mechanism.

The handle 81 is held in the open position shown in Figure 7 against the tension of the spring 82, by the engagement of the lug 83 on the handle with the spring latch 84. The structure of the latch is clearly shown in Figures 7 and 9.

A suitably mounted bearing 85 supports the stem 86 of the latch. A spring 87 interposed between the bearing 85 and the adjustable nut 88 on the stem 86, keeps the latch in the normal position. It will be readily understood that on moving the handle 81 to the position at the left, the lug 83 will engage the recess 89, the beveled portion 90 of the latch 84 and remain in that position until the latch 84 is lifted by means of the disconnector arm 91 described below.

In view of the fact that the spray liquid is of such a nature as to be subject to settlement if left standing quietly in the tank 77, means is provided for agitating the liquid in the interim when a finished casing is taken off and an unfinished one is put in position on the machine. This means includes an escape valve 92 in the air pipe connection 93 to the tank 77. The handle 94 of the valve is operated by a pendent connection 95 which is pivoted to the operating lever 11. When the lever 11 is raised to raise the guide sheaves 8 and permit the removal of the tire casing T, the escape valve 92 is opened to permit a slight escape of air from the top of the tank 77. In view of the fact that compressed air is admitted to the bottom of the tank through the pipe 78, the reader will observe at once that the liquid will be agitated by the passage of the compressed air, so that the contents will not have a chance to settle while the spraying mechanism is out of operation. Under other circumstances, namely, where the spraying mechanism is in operation, the liquid is of course continuously agitated.

Figure 9:
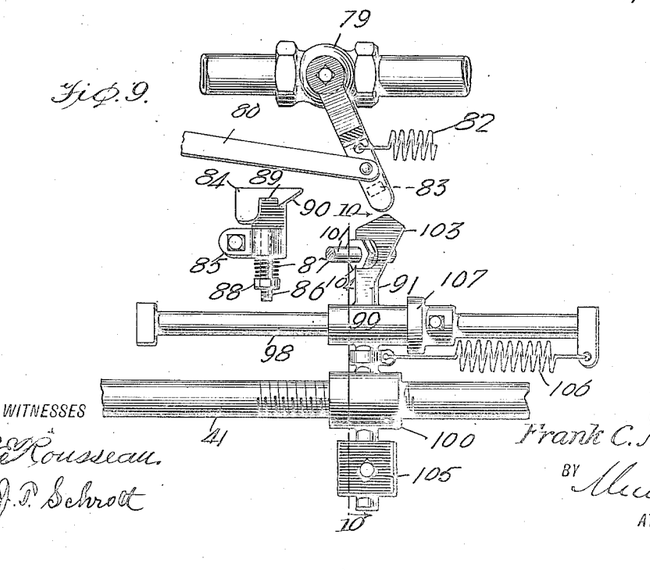
Figure 9 is a detail plan view showing parts of the drive and lock mechanism in Figure 7, in the normal position.
Figures 10, 11, 12:
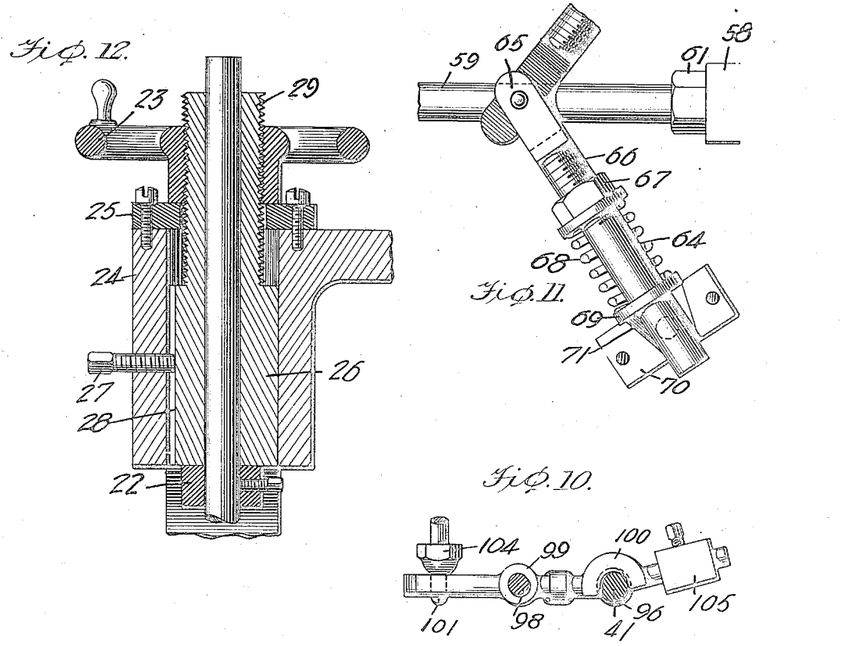
Figure 10 is a cross section on the line 10—10 of Figure 9.
Figure 11 is a detail sectional view of a portion of the toggle latch mechanism in Figure 7.
Figure 12 is a detail vertical section on the line 12—12 of Figure 4.

The automatic stop mechanism operates about the time when a tire casing T is completely trimmed and lined. Attention is directed to Figures 7, 9 and 10. The sheave shaft 41 is partly threaded at 96. Suitably mounted in brackets 97 adjacent to the shaft 41, is a guide rod 98 on which the slide 99 of the disconnector arm 91 moves. This slide is both a bearing for the arm and also a pivotal mounting therefor, because the arm 91 must rock on the rod 98 in order that the semi-circular screw follower 100 may be lifted out of and moved into engagement with the threads 96.

This rocking motion of the disconnector arm 91 is accomplished by the spindle 101. This spindle is suitably mounted on a lateral extension 102 of the operating lever 11 and projects through an aperture in the disconnector head 101 of the arm 91. An adjustable nut 104 provides an abutment which bears against the head 103. A weight 105, on the extremity of the arm 91, normally holds the semi-circular screw follower 100 in engagement with the thread 96. On raising the follower 100 out of engagement with the threads 96, the arm 91 is drawn back to the starting position, by a spring 106.

The backward motion of the arm is limited by an adjustable stop 107 on the guide rod 98. The respective ends of the spring 106 are attached to the arm 91 and to one of the bearings 97 as clearly shown in the drawings.

Attention is now principally directed to Figure 14, wherein the triple valve arrangement referred to above, is illustrated. This arrangement provides for the separate but simultaneous control of the liquid, compressed air and benzine, which is for the purpose of keeping the substance of the liquid from hardening in the pipes while a tire casing is being removed. This will presently be clearly understood.

Arranged in vertical alinement with the liquid throttle valve 79 is an air throttle valve 109 and a benzine valve 110. All three are operated simultaneously by the handle 81 which is properly constructed for the purpose. One side of the spray pipe 76 leads to the tank 77, as already explained, while the other end leads to the spray head where it is provided with a back check valve 111 for the purpose of preventing any back pressure or entrance of air or benzine into the pipe line 76.

A nozzle 112, turned at right angles to the pipe 76 and situated in the air pipe 113 of the spray head, introduces the liquid. It is capable of control by a needle valve 114, which is locked in adjusted positions by a lock nut 115. The continuation of the air pipe 113 extends to a suitable source of compressed air, and it is this continuation or extension of the pipe that carries the throttle valve 109. This extension also carries the benzine check valve 114$^a$, with a spring 115 of sufficient strength to normally support the weight of benzine against the valve and keep the valve from opening by virtue of the pressure against it.

Benzine enters the air pipe 113 between the valve 114$^a$ and air valve 109, by a pipe 116 in which the benzine valve 110 is located. This pipe leads to the tank 117 which is kept filled with benzine. The portion of the pipe 113 referred to, is filled with benzine only when the machine is out of operation and the valves 79 and 109 are closed. At this time, the valve 110 is opened.

In order to effect the proper operation, the kerf of the valve 79 is located longitudinally of the axis. The kerf of the valve 109 is located transversely of the axis, while the valve 110 merely has a minute bore. In turning the handle 81 to the left from the position shown in Figure 14, the valve 110 will soon close, the valve 109 will open first, admitting compressed air to blow the pocketed benzine ahead of it and out of the spray opening, the valve 79 being opened last to finally permit passage of the spray fluid.

The benzine serves to remove any hardened accumulations of the substance of the spray fluid, so that by the time that the spray fluid arrives, the passages are all clear and there will be no obstruction to the operation of the machine. The reverse operation takes place on stopping the machine, namely, the spray valve is closed first, the air valve next, and finally the benzine valve is opened to let in a charge of benzine.

Figure 16:
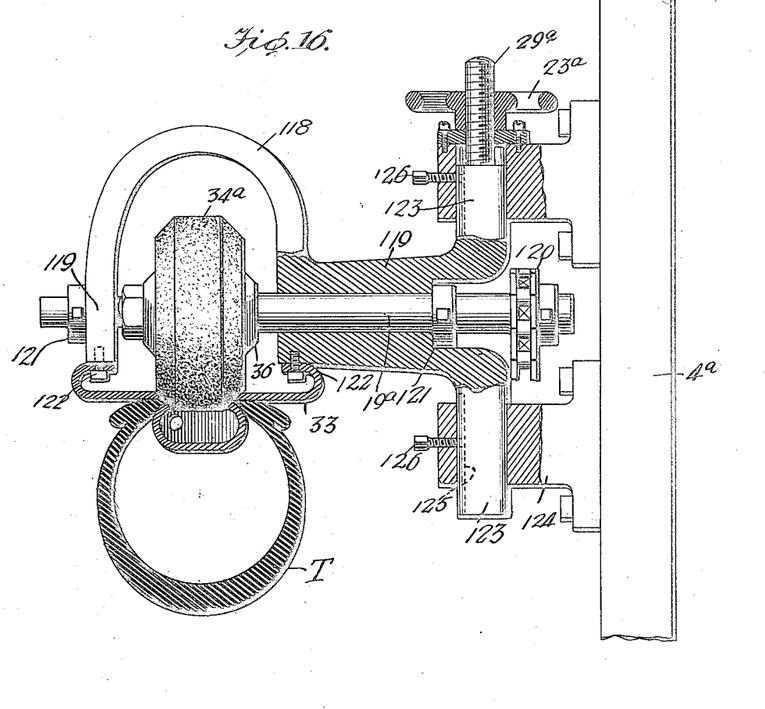
Figure 16 is a vertical sectional view of a slight modification of the machine.

The modification in Figure 16 embodies substantially the same construction shown in some of the other views of the drawings, but shows how the mechanism can be simplified. Here the abrading wheel 34$^a$ is mounted on the horizontally disposed shaft 19$^a$, which is the equivalent of the vertical shaft 19 in Figure 4.

A yoke-like frame 118 includes suitable bearings 119 in which the shaft 19$^a$ is journaled. The shaft is driven directly from the shaft 32 by the chain and sprocket connections 120. Set collars 121 enable endwise adjustment of the shaft so as to properly position the abrading wheel.

Adjustments of the kerfs 35 of the bead guard 33 with reference to the abrading wheel 34$^a$, are made by introducing shims at the points of connection 122 of the bead guard to the yoke frame. Stub shaft ends 123 of the yoke frame 118, are vertically slidable in blocks or brackets 124 projecting from the main standard 4$^a$.

These stub shafts have key ways 125 which are occupied by the points of set screws 126. These set screws keep the stub shafts from turning in the brackets and also enable setting the various vertical adjustments of the yoke frame. Such adjustments are obtained by means of the hand wheel 23$^a$ and the screw portions 29$^a$ of the uppermost stub shaft 23. Otherwise, the operation of the modification in Figure 16 will be understood at once without further explanation.

*The operation.*

In the normal state of the parts, that is to say, before a casing T is put in place on the machine, the operating lever 11 is raised and supported on the rest 108 on the right side of the yoke 3. In thus raising the lever 11, the upper guide sheaves 8 are lifted so as to make room for the insertion of the tire casing. The raising of the sheaves 8 is accomplished by the connections 14, 15 and 9 in Figure 1.

The lower sheaves 7, which serve to rotate the tire casing T toward the left when the machine is in operation, are now idle because the starting handle 60 normally stands inclined toward the rear, and therefore the clutch 54 is shifted out of engagement with the loose sprocket 44 and consequently no driving motion is imparted to the shafts 40 and 41 through the drive chain 43.

The bead abrading wheel 30 and the peripheral fin abrading wheel 31 rotate continuously. As already stated, the abrading wheel 30 is capable of vertical adjustment by turning the hand wheel 23 at the top, but such adjustment is required only when a different size of tire casing is to be treated in the machine. In inserting the tire casing, the lateral sides or beads b are slipped in place in the creases 34 of the bead guard 33, so that the thin rubber fins on the edges of the beads fit in the kerfs or slits 35 in the creases to be removed by the action of the abrading wheel 30.

Figure 15:
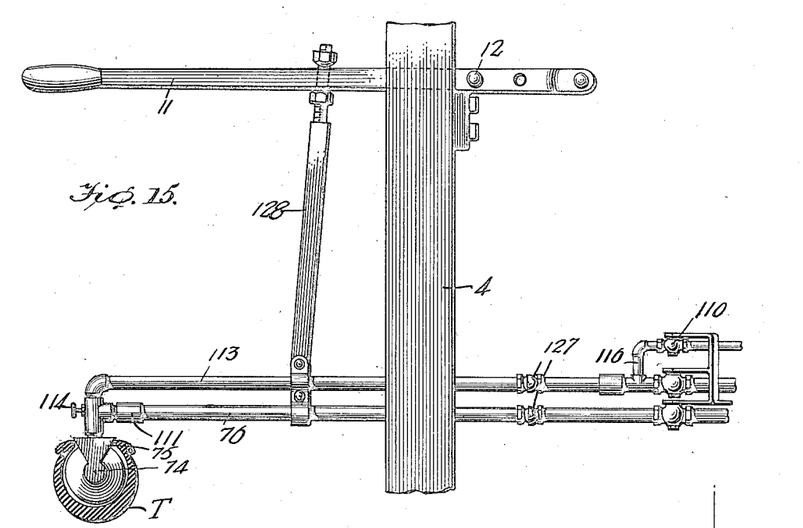
Figure 15 is a detail side elevation showing the lifting arrangement for the spray head.

Upon removing the lever 11 from the rest 108 on the standard 4, the upper guide sheaves 8 are brought to bear on the tire casing T by virtue of their own weight. They serve to hold the casing in position. The same action of lowering the lever also brings the spray head into operative position in the tire casing. Proper connections are shown in Figure 15. The pipes 76 and 113 are jointed at 127 so as to enable movement thereof when actuated by the connection 128 which leads to the handle 11.

Now the operator starts pulling the starting handle 60 forwardly. He pulls it only a short distance, thereby starting the revolution of the tire casing before the spraying operation commences. On pulling the handle 60 forwardly a short distance, the toggle pivot 65 is conveyed to the dead center and slightly past, whereupon the springs 68 act to throw the clutch 54 into engagement. The handle 60 is held still, the remaining movement of the link connection 69 being provided for by the connection 59ª in Figure 13.

Thus the rotation of the tire casing is started before the spraying action begins. The operator now pulls the handle 60 the rest of the way, thereby pulling the link 80 and moving the valve handle 81 into engagement with the recess 89 of the latch 84. The spraying operation thus begins. But incidental to this spraying operation, it is to be borne in mind that the charge of benzine between the valve 114ª and valve 109 in Figure 14, is forced out ahead of the compressed air coming through the pipe line 113, thus clearing out accumulations of hardened lining substance and making room for the lining liquid coming through the pipe 76. The peculiar arrangement of the kerfs in the valves 79 and 109, makes it possible to open the pipe lines 113 before the liquid pipe line 76 is opened.

Reverting for a moment to the time when the lever 11 was raised into engagement with the rest 108, whereupon a previously finished tire casing was removed from the machine, the disconnector arm 91, which had then traveled forwardly to the limit of the head 96, was rocked on the fulcrum 99 so that the semi-circular follower 100 was moved out of engagement with the threads and the spring 106 drew the arm 91 back against the stop 107. The position thus assumed, as shown in Figure 9, is the normal or starting position.

Returning now to the operation, on lowering the handle 11, the escape valve 92 is closed and the disconnector arm 91 is allowed to rock on its fulcrum 99 so that the semi-circular screw follower 100 engages the thread 96 at the extreme right. The follower 100 with its carried parts, is caused to move forwardly by reason of the turning of the shaft 41. As soon as the disconnector head 103 engages the beveled portion 90 of the latch 84, the latch is displaced against the tension of the spring 87 and the lug 83 of the handle 81 is released, so that the spring 82 closes the throttle valve 79. The spring 82 is more powerful than are the springs 68 of the toggle lock mechanism.

The rotating and spraying actions of the machine are thus automatically stopped when the screw follower 100 reaches the left extremity of the thread. The zone of threads on the shaft 41 is made long enough so that the stopping operation takes place about the time when the tire is finished.

While the construction and arrangement of the improved tire trimming and lining mechanism as herein described and claimed, is that of a generally preferred form obviously modifications and changes may be made without departing from the spirit of the invention or the scope of the claims.

I claim:—

1. A machine for trimming automobile tire casings comprising instrumentalities for supporting the casing, means for removing fin-like portions along the beads of the casing, means for removing fin-like portions along the periphery of the casing while supported, and common drive means for both removing means.

2. A machine for trimming tire casings comprising casing supporting means, means independent of the supporting means for removing fin-like rubber portions along the beads of the casing, means independent of both the supporting and bead-removing means for removing a fin-like portion along the periphery of the casing, and means by which the three foregoing means are driven in common to respectively rotate the casing and perform the trimming functions.

3. A machine for trimming and lining tire casings, comprising means for supporting a casing, means operative to remove fin-like portions along the beads and periphery of the casing, and operatively associated means for spraying a lining on the interior of the casing during the trimming operation.

4. A machine for trimming and lining a tire casing, comprising means for supporting and rotating a casing, relatively stationary but operative means for removing fin-like portions along the beads and periphery of the casing, and means for spraying a lining substance on the interior of the casing during the removal of said fin-like portions.

5. A machine for trimming and lining tire casings, comprising means for supporting and revolving a casing, relatively stationary operating means for removing fin-like portions along the beads and periphery of the casing, and means located at one side of the trimming means, for spraying a lining substance on the interior of the casing as the trimming operation progresses.

6. A machine for trimming and lining tire casings, comprising means for supporting a casing, continuously operative means arranged to remove fin-like portions along the beads and periphery of the casing, means arranged to spray a lining substance on the interior of the casing, and instrumentalities for simultaneously setting the supporting means in operation so that the casing is made to revolve, and starting the spraying means so that the interior is sprayed as the casing revolves.

7. Means for supporting and revolving a tire casing, relatively stationary abrading members, one being operatively disposed adjacent to the casing beads, the other being operatively disposed at the periphery of the casing; operatively associated guard means preventing injury to the beads by the bead abrading member, and suction operated means for removing the grindings from around said bead abrading member to keep the grindings from falling inside of the casing.

8. Means for supporting and revolving a tire casing, relatively stationary abrading means operatively arranged to remove fin-like portions from along the casing beads and periphery, means for guarding the beads from injury by the bead abrading means for permitting the fin-like portions to be acted on and removed by the abrading means, suction operated means for removing the grindings from the neighborhood of the bead abrading means, and means for spraying a lining substance on the interior of the casing following the abrading operation.

9. The combination of means for supporting and revolving a tire casing, abrading means for removing a fin-like portion along the periphery of the casing, means for abrading and removing fin-like portions along the edges of the beads of the casing, and means for adjusting said bead abrading means in respect to the casing and the first abrading means.

10. Means for supporting and revolving a tire casing, abrading means for removing a peripheral fin-like portion from the casing during rotation, abrading means for removing fin-like portions from the edges of the casing beads during rotation, guard means normally relatively fixed in respect to the bead abrading means, protecting the beads from the abrading means and permitting the fin-like portions to come through; and means for bodily adjusting said guard means and bead abrading means in respect to the casing and the first abrading means.

11. Continuously operating abrading means for removing fin-like portions along the beads and the periphery of a tire casing, means for supporting said bead abrading means, a bead guard carried by said supporting means for protecting the beads from the abrading means, but including creased portions with kerfs for admitting the fin-like portions to the abrading means; means for supporting the tire casing, means for setting said supporting means in motion to rotate the casing in respect to the abrading means, and means for raising and lowering the support of the bead abrading means without stopping either the rotation of the casing or the operation of the abrading means.

12. A machine for trimming and lining tire casings, comprising supporting means for rotating a casing, independently operated and continuously movable abrading means for removing fin-like portions from the edges of the beads and periphery of the casing during rotation, instrumentalities for protecting the beads from the bead abrading means and removing the grindings by suction, and instrumentalities for applying a lining substance to the interior of the casing, following the abrading operation, including means for preventing the escape of the lining substance to the outer surfaces of the casing.

13. The combination, of bead abrading means for removing fin-like portions from the beads of a tire casing, adjustable means on which the abrading means is journaled, guard means carried by the supporting means for admitting only the fin-like portions to the abrading means, and means for adjusting the abrading means on the supporting means in respect to the guard means.

14. The combination, of a bead guard with kerfs for admitting fin-like rubber portions on the edges of the beads of a tire casing, a revolving abrading wheel operating on the inside of the guard for removing said fin-like portions, and means for adjusting the abrading wheel in respect to said kerfs.

15. The combination, of a continuously rotating abrading wheel for removing fin-like portions from the beads of a casing, means enabling adjustment of the abrading wheel toward and from the casing, and a bead guard for receiving the lateral casing beads and protecting them from the abrading wheel, including kerfs to admit the fin-like portions to the abrading wheel, and having a bridge portion extending under the abrading wheel to fix the positions of the kerfs and prevent injury to the casing by adjusting the abrading wheel too far down.

16. Continuously revolving bead abrading means, a standard on which said means is journaled, relatively fixed means for supporting the standard, and means for adjusting the standard and abrading means up and down in the supporting means without turning the standard.

17. A machine for trimming tire casings, comprising continuously operative abrading means for removing fin-like portions from the beads and periphery of a casing, supporting means arranged to revolve the casing in respect to the abrading means, relatively fixed guide means operatively associated with said revolving supporting means, and guide means movable into contact with the casing near the top for holding the casing in position on said supporting means.

18. The combination of continuously revoluble abrading wheels for removing fin-like rubber portions from the bead and periphery of a tire casing, normally inactive sheaves for supporting a casing in operative position in respect to said abrading wheels, normally dormant spray apparatus for applying a lining to the interior of the casing as the abrading operation progresses, and instrumentalities for simultaneously starting and stopping the operation of the supporting sheaves and the spraying apparatus without affecting the operation of the abrading wheels.

19. A plurality of sheaves arranged to be driven to rotate a tire casing when supported thereon, a plurality of idler guide sheaves arranged to bear on the casing periphery during rotation to support it on the guide sheaves, means providing a pivotal support for the idler sheaves, and means for actuating said support to move idler sheaves out of operative position.

20. A frame including a yoke standard, a plurality of driven sheaves journaled on the frame arranged to rotate a tire casing when supported thereon, a plurality of idler guide sheaves arranged to rest on the casing to hold it in position during rotation, means on which the guide sheaves are journaled, movably mounted on portions of the yoke standard; means for actuating the supporting means to move the guide sheaves up and down, and means carried by the yoke standard for supporting said actuating means in one position to hold the guide sheaves out of operative engagement with the casing.

21. Normally idle tire casing supporting drive sheaves, continuously operating drive mechanism, tire casing trimming means continuously operated by said drive mechanism, normally dormant spray mechanism, instrumentalities movable in one direction to simultaneously connect the supporting sheaves to the drive mechanism and render them operative and render the spray mechanism active, and means operatively associated with said instrumentalities for automatically reversing the movement thereof to simultaneously stop the drive sheaves and spraying operation.

22. Normally idle drive sheaves for supporting and rotating a tire casing to be trimmed, continuously operating drive mechanism, trimming means continuously operated by said mechanism, normally dormant spray mechanism including a normally closed valve, instrumentalities movable in one direction and arranged to simultaneously connect drive sheaves to the drive mechanism while the casing is rotated, and opening the valve to set the spray mechanism in operation; instrumentalities operatively arranged to hold the valve and keep the drive sheaves in operation, and operatively associated means under control of a part set in motion by the simultaneous starting of the drive sheaves and spray mechanism, for automatically actuating the aforesaid instrumentalities in the other direction to close the valve and disconnect the drive sheaves.

23. The combination, of a moving drive sheave, drive mechanism therefor with means whereby the drive mechanism is operatively connected to the sheave, means set in motion in one direction by the movement of the drive sheave, and continuing in said direction until the sheave drive connecting means is reversely actuated to disconnect the drive mechanism, and an independently operable lever, including means for disengaging said movable means whereby it is restored to the starting position.

24. The combination, of a moving drive sheave whereby a tire casing supported thereon is rotated, drive mechanism, with connecting means whereby the sheave is driven; and means in operative engagement with a moving part of said drive sheave, whereby said engaging means is moved in one direction until it engages and automatically actuates said connecting means to disconnect the drive mechanism.

25. The combination, of a guide sheave actuating lever whereby guide sheaves operatively connected thereto are lifted, a rotating shaft with a threaded portion and a sheave on which a tire casing is supported to be rotated, drive means with means whereby it is operatively connected to said shaft, follower means in operative engagement with said threaded portion to move in one direction and finally engage said connecting means to automatically disconnect the drive means and stop the drive sheaves, and means operatively associated with said lever for disengaging the follower means upon raising said guide sheaves, including means for restoring said follower means to the starting position.

26. The combination, of continuously operating rubber fin-removing means, associated tire casing supporting means, normally idle but arranged to be set in motion to revolve a casing in respect to said fin removing means; and instrumentalities for spraying a lining fluid on the interior of the casing, including means for initially introducing a solvent in the spray passages.

27. The combination of rubber fin removing means, means for operating said removing means continuously, means to support a casing in respect to said removing means, and means for setting in motion or stopping the supporting means when desired without stopping the fin-removing means.

28. A tire trimming machine including a yoke, sheaves arranged to support a tire casing, idler sheaves to bear on the casing to keep it in position, means by which the idler sheaves are pivotally supported on the yoke to move away from and toward the casing, a pivoted lever having connection to the supporting means to actuate the idlers, and a rest on the yoke upon which the lever is placed to release the idlers from a casing and from which it is removed to let the idlers bear on the casing by virtue of their weight.

29. A tire trimming machine including a yoke with diverging arms, sheaves arranged to support a tire casing, idler sheaves to bear on the casing to keep it in position, means including sheave arms on which the idlers are journalled and which are pivoted on said yoke arms, a rest on the yoke, a lever pivoted on the yoke, and connections between said sheave arms and lever to enable lifting the idlers when the lever is on the rest and let the idlers bear on the tire casing when the lever is off of the rest.

30. A machine for trimming and lining tire casings comprising means to support a casing, means to bear on the casing so as to keep it in position on the support, means to trim the casing while on the support, apparatus for spraying the interior of the casing, mounting means for said bearing means by which the bearing means may be moved, a lever by which the mounting means is actuated to let the bearing means down on the casing, a rest upon which the lever is placed in order to release the bearing means from the casing and from which it is removed so as to apply the weight of the bearing means upon the casing, and agitating means associated with the lever and spraying apparatus causing an agitation of the spray material while the lever is on the rest to keep it from settling while changing casings.

31. A machine for trimming and lining tire casings comprising sheaves to support and rotate a casing, idler sheaves to bear on the casing and keep it in place on the support, means to trim the casing during rotation, a spray head to line the casing during rotation, and means to let the idler sheaves down upon the casing preparatory to rotation and move the spray head into the casing preparatory to trimming.

32. A machine for trimming and lining tire casings comprising sheaves to support and rotate a casing, idler sheaves to bear on the casing and keep it in place on the support, means to trim the casing during rotation, spray apparatus including a jointed pipe and spray head, and a lever having connections to simultaneously let the idler sheaves down upon the casing and lower the spray head into the casing by virtue of the joint in the pipe preparatory to rotation and trimming of the casing.

33. A machine for trimming and lining tire casings comprising sheaves to support and rotate a casing, idler sheaves to bear on the casing and keep it in place on the support, means to trim the casing during rotation, spray apparatus including a jointed pipe and spray head, a lever having connections to simultaneously let the idler sheaves down upon the casing and lower the spray head into the casing by virtue of the joint in the pipe preparatory to rotation and trimming of the casing, and means associated with the spray head to contact adjacent parts of the casing to prevent the spray from the head from escaping at the open side of the casing.

FRANK C. MOORE.